(12) United States Patent  (10) Patent No.: US 7,959,223 B2
Marsden et al.  (45) Date of Patent: Jun. 14, 2011

(54) ENERGY-DISSIPATION SYSTEM

(75) Inventors: Andrew W Marsden, Hingham, MA (US); Ward Fritz, Chelsea, MA (US); Walter S Bezaniuk, Berkley, MA (US); Langley Joe, Foxboro, MA (US); Gregory C Moser, Columbus, IN (US)

(73) Assignee: Cosco Management, Inc., Wilmington, DE (US)

( * ) Notice: Subject to any disclaimer, the term of this patent is extended or adjusted under 35 U.S.C. 154(b) by 166 days.

(21) Appl. No.: 12/469,539

(22) Filed: May 20, 2009

(65) Prior Publication Data

US 2010/0295345 A1 Nov. 25, 2010

(51) Int. Cl.
*B60N 2/42* (2006.01)
*B60R 21/16* (2006.01)
(52) U.S. Cl. .............. 297/216.11; 297/216.1; 280/730.1
(58) Field of Classification Search .............. 297/216.1, 297/216.11; 280/739, 729, 728.1, 730.1; 180/271, 274
See application file for complete search history.

(56) References Cited

U.S. PATENT DOCUMENTS

| | | | |
|---|---|---|---|
| 4,213,202 A * | 7/1980 | Larry | 2/456 |
| 4,534,068 A * | 8/1985 | Mitchell et al. | 2/414 |
| 4,642,814 A * | 2/1987 | Godfrey | 2/462 |
| 4,883,299 A * | 11/1989 | Bonar | 293/110 |
| 4,899,961 A | 2/1990 | Herndon | |
| 4,919,483 A | 4/1990 | Horkey | |
| 5,235,715 A | 8/1993 | Donzis | |
| 5,292,175 A | 3/1994 | Artz | |
| 5,292,176 A | 3/1994 | Artz | |
| 5,335,968 A | 8/1994 | Sheridan et al. | |
| 5,567,015 A | 10/1996 | Arias | |
| 5,881,395 A | 3/1999 | Donzis | |
| 6,485,101 B2 | 11/2002 | Kassai et al. | |
| 6,519,780 B2 | 2/2003 | Goodwin | |
| 7,125,073 B2 | 10/2006 | Yoshida | |
| 7,232,182 B2 | 6/2007 | Yoshida | |
| 7,234,771 B2 | 6/2007 | Nakhla | |
| 7,246,853 B2 | 7/2007 | Harcourt et al. | |
| 7,293,828 B2 * | 11/2007 | Yoshida | 297/216.11 |
| 7,654,613 B2 | 2/2010 | Bass | |
| 7,717,506 B2 | 5/2010 | Amesar et al. | |
| 7,726,734 B2 | 6/2010 | Mahal et al. | |
| 7,744,154 B2 | 6/2010 | Marsden et al. | |
| 7,748,781 B2 | 7/2010 | Bass | |
| 7,774,866 B2 * | 8/2010 | Ferrara | 2/455 |
| 2001/0043001 A1 | 11/2001 | Kassai et al. | |
| 2002/0153753 A1 | 10/2002 | Kassai | |

(Continued)

FOREIGN PATENT DOCUMENTS

EP 0928718 7/1999

(Continued)

OTHER PUBLICATIONS

International Search Report dated Feb. 13, 2009, for International Application No. PCT/US2008/087382.

(Continued)

*Primary Examiner* — Sarah B McPartlin
(74) *Attorney, Agent, or Firm* — Barnes & Thornburg LLP

(57) ABSTRACT

A child restraint includes a juvenile vehicle seat and an energy-absorption apparatus coupled to the juvenile vehicle seat. The energy-absorption apparatus is configured to absorb external energy associated with an external impact force applied to the energy-absorption apparatus.

20 Claims, 4 Drawing Sheets

U.S. PATENT DOCUMENTS

| | | |
|---|---|---|
| 2007/0085394 A1 | 4/2007 | Yang |
| 2007/0252418 A1 | 11/2007 | Harcourt et al. |
| 2008/0258518 A1 | 10/2008 | Santamaria |
| 2009/0066125 A1* | 3/2009 | Nett et al. ............... 297/216.11 |
| 2009/0152913 A1 | 6/2009 | Amesar et al. |
| 2009/0179469 A1 | 7/2009 | Bass |
| 2009/0179470 A1 | 7/2009 | Bass |
| 2009/0256404 A1 | 10/2009 | Strong et al. |
| 2010/0019554 A1 | 1/2010 | Mahal et al. |
| 2010/0026064 A1 | 2/2010 | Marsden et al. |
| 2010/0134470 A1 | 6/2010 | Bu et al. |
| 2010/0194158 A1* | 8/2010 | Mahal et al. ............ 297/216.11 |

FOREIGN PATENT DOCUMENTS

| | | |
|---|---|---|
| EP | 1167114 | 1/2002 |
| WO | 2009076514 | 6/2009 |

OTHER PUBLICATIONS

International Preliminary Report on Patentability (Ch. II) issued in connection with PCT/US2008/087382 and completed by the US Examining Authority on Oct. 9, 2010.

European Search Report dated Aug. 31, 2010 for related European Application No. EP 10163494.

* cited by examiner

ENERGY-DISSIPATION SYSTEM

BACKGROUND

The present disclosure relates to energy-absorbing apparatus, and in particular, to devices for dissipating energy associated with external impact forces. More particularly, the present disclosure relates to an energy-dissipation system included in a juvenile product such as a child-restraint system.

When exposed to an external impact force, a juvenile vehicle seat at rest on a seat in a car or truck will accelerate as it moves to a new location in the passenger compartment of a car or truck. A child seated in such a moving juvenile vehicle seat will also accelerate as the juvenile vehicle seat moves in the passenger compartment.

A g-load is a measurement of an object's acceleration measured in gs. The g is a non-SI unit equal to the nominal acceleration due to gravity on earth at sea level. A short-term acceleration experienced by a child seated in a juvenile vehicle seat (or any other juvenile seat) that moves suddenly is called a shock and is measured in gs.

SUMMARY

An energy-dissipation system in accordance with the present disclosure is included in an apparatus that is exposed to external impact forces. In an illustrative embodiment, the energy-dissipation system is coupled to a juvenile vehicle seat to provide a child-restraint system.

In illustrative embodiments, the energy-dissipation system includes a ride-down pad comprising a first force dissipater containing a volume of air that is discharged at a metered rate when the first force dissipater is exposed to an external impact force. The ride-down pad further includes a neighboring second force dissipater containing a volume of air that is discharged at a metered rate when the second force dissipater is exposed to an external impact force. The first and second force dissipaters thus cooperate to provide means for absorbing external energy applied to the ride-down pad to minimize g-loads experienced by a child seated in a juvenile vehicle seat exposed to an external impact force.

In illustrative embodiments, the ride-down pad includes first and second air bags for holding air or other fluid in an air chamber until deformation of the air bags following exposure to an external impact force. The first and second air bags are arranged to meet along a seam common to both air bags. The first bag is formed to include a first air chamber and the second bag is formed to include a second air chamber.

In illustrative embodiments, each air bag is made of a deformable material formed to include an air-discharge port opening into the air chamber formed in the air bag. The air-discharge port of the first bag and the air-discharge port of the second bag merge with one another at the seam to form a seam aperture opening into the air chamber of each air bag. During air bag deformation, air flows out of both of the first and second air chambers through the seam aperture located at the seam common to both air bags.

In illustrative embodiments, the ride-down pad also includes a deformable support frame located in the air chamber of each air bag. The deformable support frame provides means for supporting a companion air bag to maintain at least a predetermined volume of air in the air chamber until the air bag is deformed when exposed to an external impact force so that the air bag does not deform too quickly as air is discharged through the seam aperture and deforms at a rate that allows the ride-down pad to absorb external energy associated with the external impact force. External energy is absorbed as air is discharged from the air chambers of the air bags through the seam aperture and the deformable support frame is compressed after exposure of the air bags to an external impact force In illustrative embodiments, the ride-down pad includes an inner shell, an outer shell, and a partition located between the inner and outer shells. A seam aperture is formed at a seam established at a junction between the partition and the inner and outer shells by the union of a first air-discharge port opening into a first air chamber formed between the inner shell and an inner surface of the partition and a second air-discharge port opening into a second air chamber formed between the outer shell and an outer surface of the partition. A first deformable support frame is positioned to lie in the first air chamber between the inner shell and the inner surface of the partition. A second deformable support frame is positioned to lie in the second air chamber between the outer shell and the outer surface of the partition.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which:

FIG. 6 shows a diagrammatic representation of a child at a time $t_0$ before an external impact force is applied to the first side-wing panel of the headrest;

FIG. 7 is a diagrammatic view similar to FIG. 6 at a later time $t_1$ after the external impact force has been applied to the first side-wing panel and showing partial deformation of the first and second force dissipaters to cause some air to be discharged from the first and second air chambers to surroundings outside the first and second air bags through the first seam aperture; and FIG. 8 is a diagrammatic view similar to FIGS. 6 and 7 at a still later time $t_2$ showing more substantial deformation of the first and second force dissipaters to cause more air to be discharged from the first and second air chambers to the surroundings through the first seam aperture.

DETAILED DESCRIPTION

Figure 1:
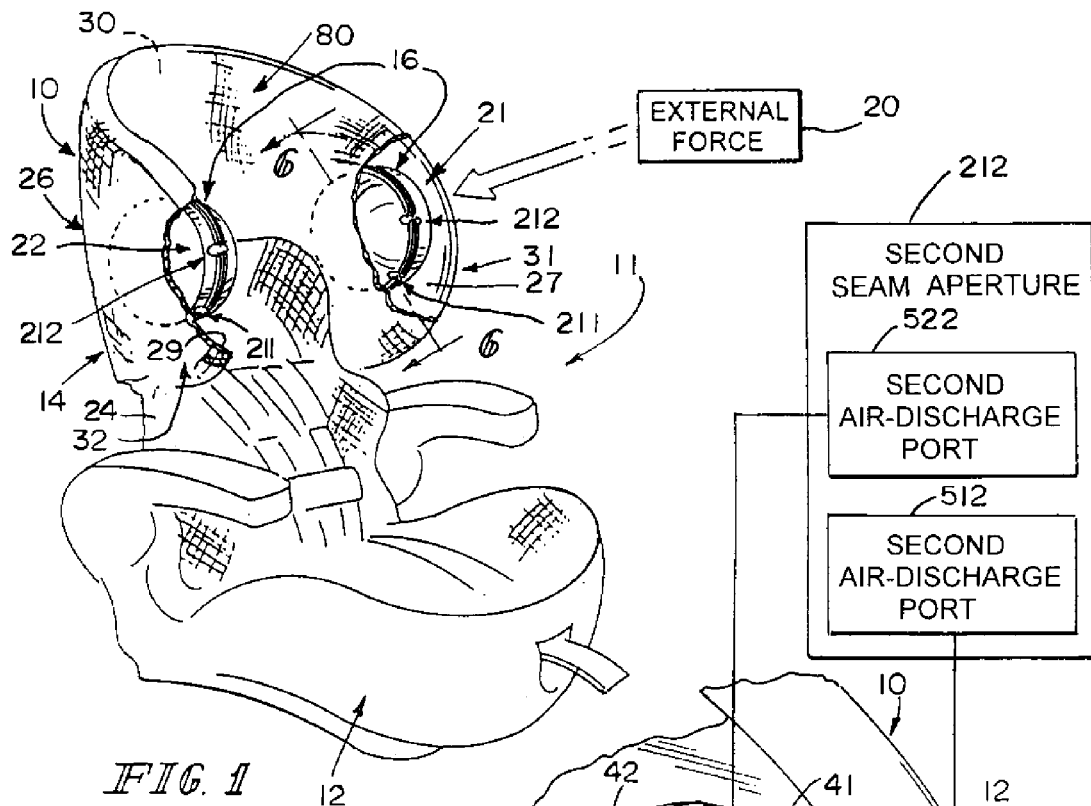
FIG. 1 is a perspective view of a child-restraint system including a juvenile vehicle seat having a seat bottom and a seat back extending upwardly from the seat bottom and an energy-dissipation system coupled to the seat back and made in accordance with the present disclosure, with portions broken away, and showing that the seat back comprises a backrest coupled to the seat bottom and a headrest coupled to the backrest and that the energy-dissipation system comprises a right-side ride-down pad mounted on an inner wall of a first side-wing panel included in the headrest and a left-side ride-down pad mounted on an inner wall of an opposite second side-wing panel included in the headrest and showing an external impact force about to strike an outer portion of the first side-wing panel carrying the right-side ride-down pad.

An illustrative child-restraint system 11 includes a juvenile vehicle seat 10 and an energy-dissipation system 16 coupled to juvenile vehicle seat 10 as suggested in FIG. 1. In illustrative embodiments, juvenile vehicle seat 10 includes a seat bottom 12 and a seat back 14 extending upwardly from seat bottom 12 and carrying energy-dissipation system 16.

Energy-dissipation system 16 comprises ride-down pads that are designed to minimize the g-loads experienced by a child seated on seat bottom 12 of juvenile vehicle seat 10 during exposure of seat 10 to an external impact force. Ride-down pads 21, 22 are shown, for example, in FIG. 1. Right-side ride-down pad 21 is formed to include first and second seam apertures 211, 212 and is shown in more detail in FIGS. 2-8. Reference is hereby made to U.S. application Ser. No. 12/327,376 filed Dec. 4, 2008, the entirety of which is hereby incorporated by reference herein, for disclosures of various ride-down pad configurations and mounting arrangements.

As suggested in FIG. 1, seat back 12 of juvenile vehicle seat 10 includes a backrest 24 arranged to extend upwardly from seat bottom 12 and a headrest 26 coupled to backrest 24. Right-side ride-down pad 21 is coupled to an inner wall 27 of a first side-wing panel 31 included in headrest 26 as suggested in FIGS. 1, 3, and 6-8. Left-side ride-down pad 22 is coupled to an inner wall 29 of a second side-wing panel 32 included in headrest 26 as shown in FIG. 1. A rear panel 30 is included in headrest 26 and arranged to interconnect first and second side-wing panels 31, 32 as suggested in FIG. 1.

During a collision or other incident, application of an external impact force 20 to first side-wing panel 31 of headrest 26 causes energy to be transferred from an impacting object (not shown) to right-side ride-down pad 21 as suggested in FIGS. 1 and 6-8. Ride-down pad 21 discharges air contained therein to the surroundings through first and second seam apertures 211, 212 and absorbs that transferred energy as suggested in FIGS. 7 and 8. Transferred energy is absorbed to minimize the magnitude of a resulting force applied to a child 100 seated in juvenile vehicle seat 10 by a force transmitter 200 comprising outer cover 80, right-side ride-down pad 21, and first side-wing panel 31 (all included in juvenile vehicle seat 10) during the collision.

Figure 7:
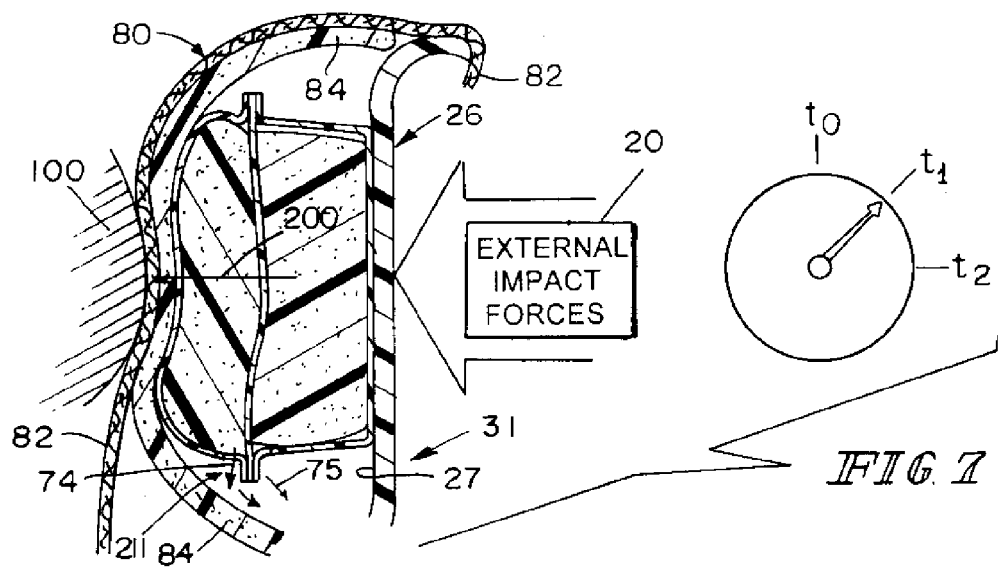
Figure 8:
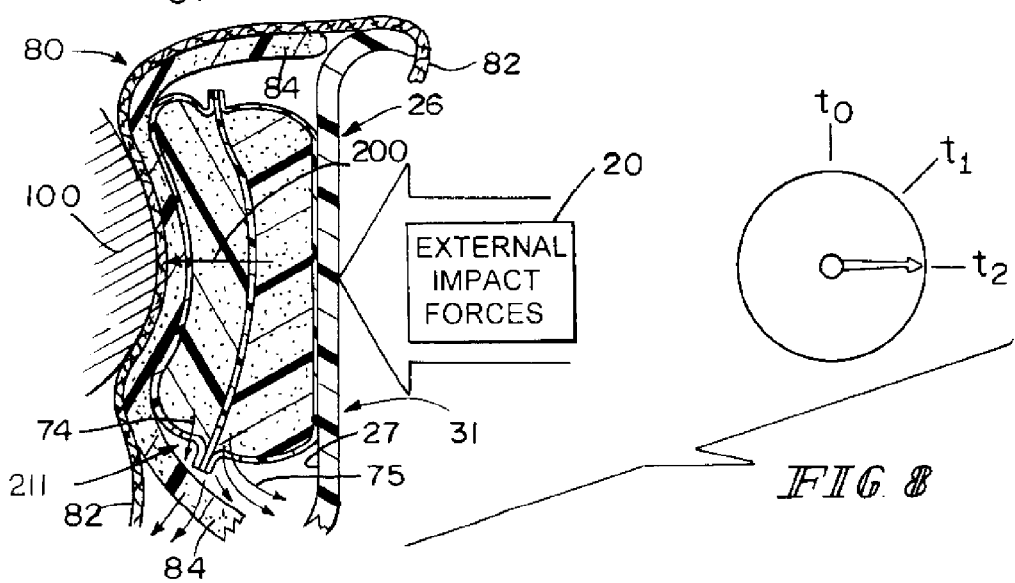

Ride-down pad 21 functions to minimize the g-loads (acceleration) experienced by child 100 seated on seat bottom 12 of juvenile vehicle seat 10 during exposure of seat 10 to external impact force 20 as suggested in FIGS. 7 and 8. Ride-down pad 21 also functions to maximize the time interval (i.e., ride-down time) between the moment the impacting object strikes juvenile vehicle seat to apply the external impact force 20 to ride-down pad 21 and the moment that resulting force reaches zero. Ride-down pad 22 functions in a manner similar to ride-down pad 21.

Figure 2:
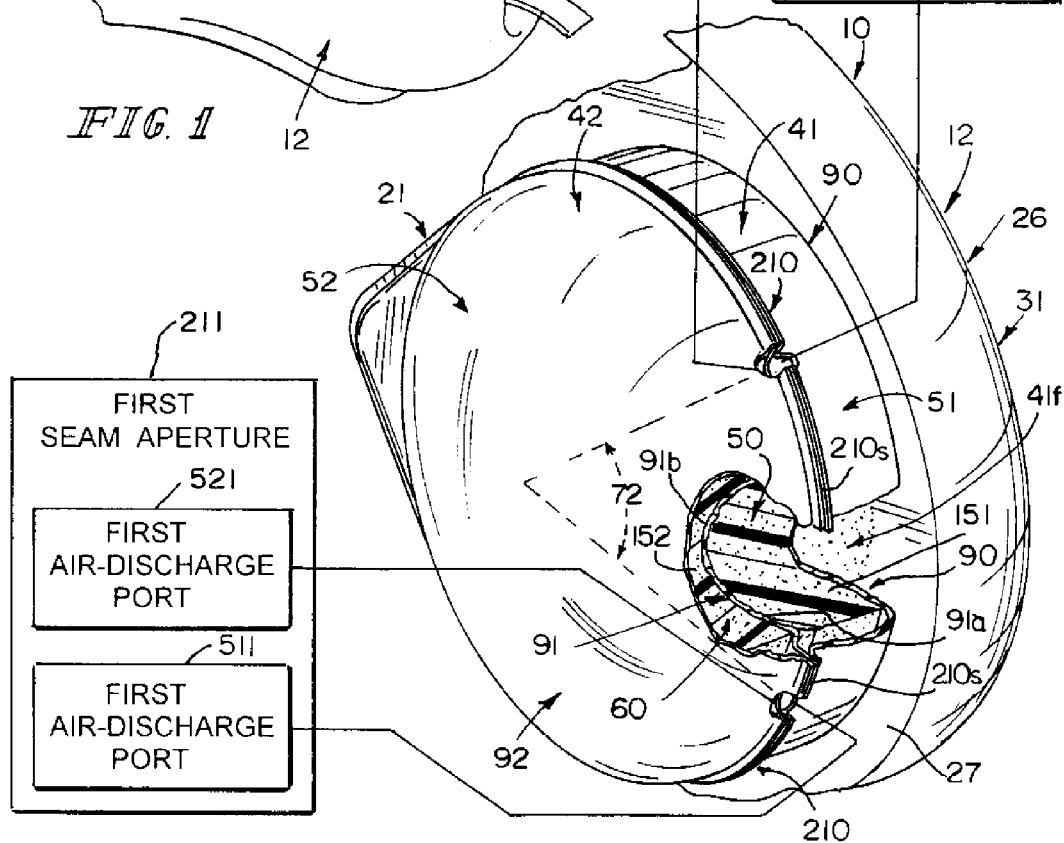
FIG. 2 is an enlarged perspective view of the right-side ride-down pad mounted on the first side-wing panel of the headrest shown in FIG. 1, with portions broken away, showing a first seam aperture formed in the right ride-down pad by a union between a first air-discharge port formed in an inner shell coupled to the juvenile vehicle seat and a companion first air-discharge port formed in an outer shell arranged to lie in spaced-apart relation to the juvenile vehicle seat to locate the inner shell therebetween and showing a second seam aperture formed in the right ride-down pad by a union between a second air-discharge port formed in the inner shell and a companion second air-discharge port formed in the outer shell.
Figure 3:
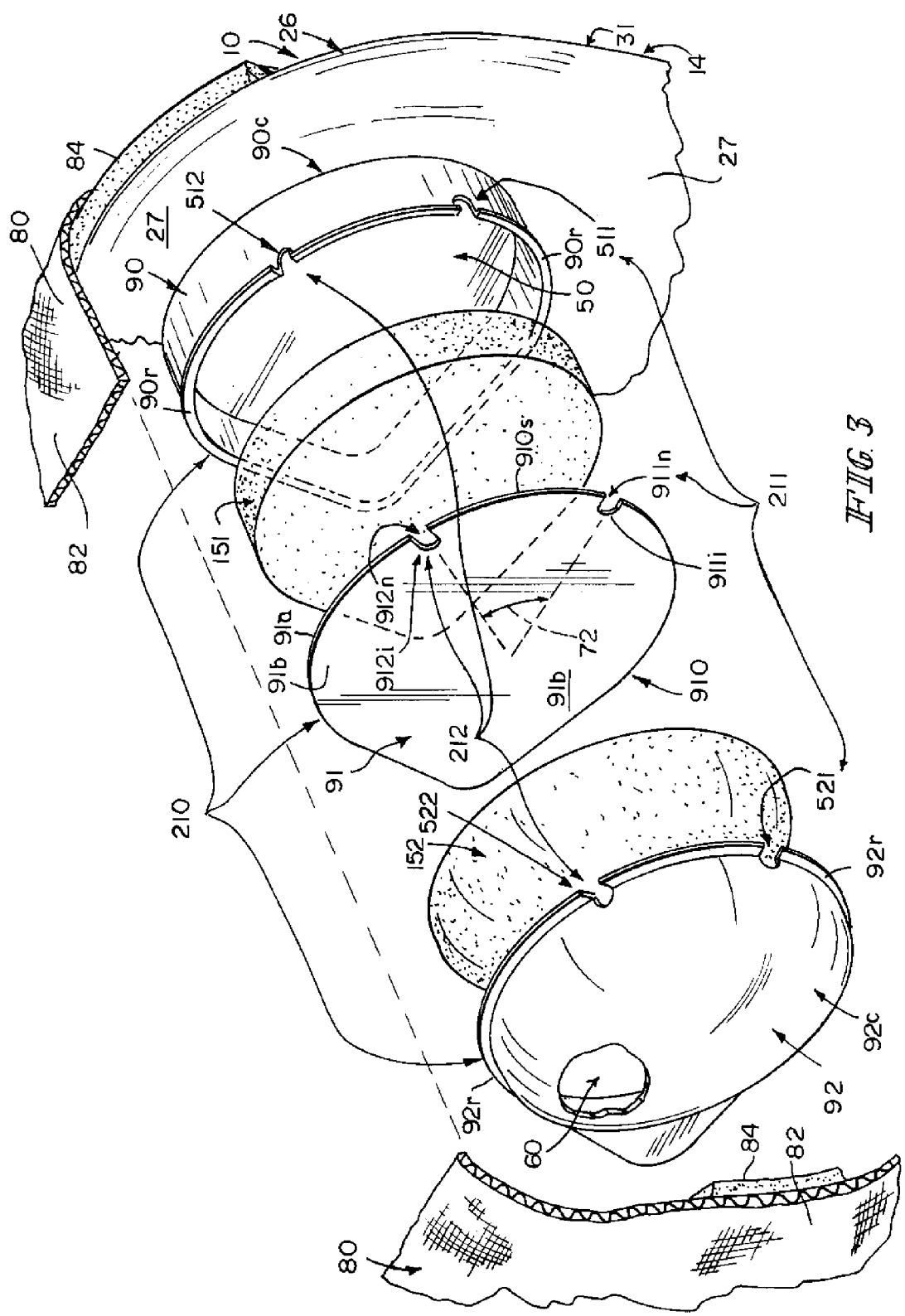
FIG. 3 is an exploded perspective assembly view of the right-side ride-down pad of FIGS. 1 and 2 showing that the ride-down pad comprises, in sequence, from right to left, an inner shell formed to include two circumferentially spaced-apart, forwardly facing air-discharge ports, a first deformable support frame, a partition formed to include two circumferentially spaced-apart notches, a dome-shaped second deformable support frame, and a dome-shaped outer shell formed to include two circumferentially spaced-apart forwardly facing air-discharge ports and suggesting that (1) the inner shell and the partition cooperate to form a first (inner) air bag having a first air chamber sized to receive the first deformable support frame therein to form a first (inner) force dissipater and (2) the outer shell and the partition cooperate to form a second (outer) air bag having a second air chamber sized to receive the dome-shaped second deformable support frame therein to form a second (outer) force dissipater.

As suggested in FIGS. 2 and 3, right-side ride-down pad 21 is a multi-stage ride-down pad comprising a first (inner) force dissipater 41 and a second (outer) force dissipater 42. In an illustrative embodiment, each of first and second force dissipaters 41, 42 comprises a vessel (such as a bag) containing a deformable support frame (such as a cushion). First and second force dissipaters 41, 42 are stacked in series so that first force dissipater 41 lies in an inner position between second force dissipater 42 and first side-wing panel 31 of headrest 26 and so that second force dissipater 42 lies in an outer position in spaced-apart relation to first side-wing panel 31.

First (inner) force dissipater 41 includes a first air bag 51 and a first deformable support frame 151 as suggested in FIGS. 2 and 3. First air bag 51 is formed to include a first air chamber 50 and separate first and second air-discharge ports 511, 512 opening into first air chamber 50. First deformable support frame 151 is located in first air chamber 50 as suggested in FIGS. 2 and 3.

Figure 4:
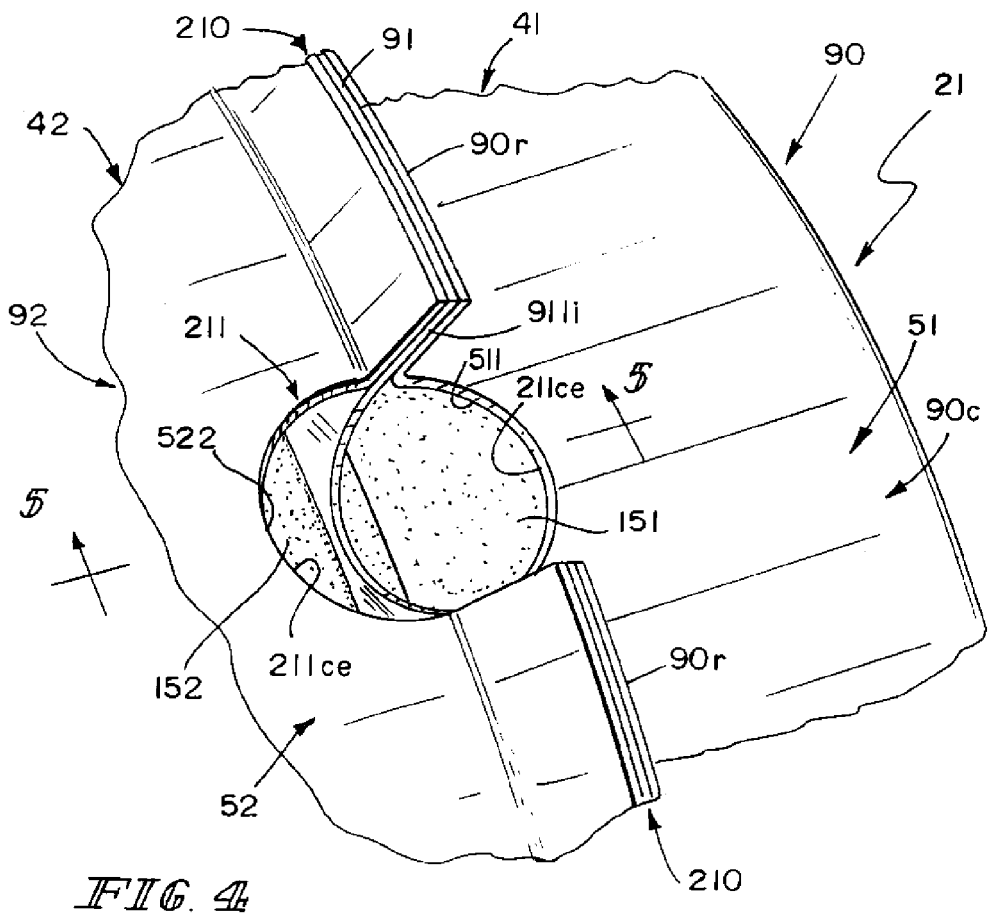
FIG. 4 is an enlarged partial perspective view of a portion of the right-side ride-down pad showing the first seam aperture in greater detail.

Second (outer) force dissipater 42 includes a second air bag 52 and a second deformable support frame 152 as suggested in FIGS. 2-4. Second air bag 52 is formed to include a second air chamber 60 and first and second air discharge ports 521, 522 opening into second air chamber 60. Deformable support frame 152 is located in second air chamber 60 as suggested in FIGS. 2-5.

First and second air bags 51, 52 mate at a seam 210 common to both air bags 51, 52 as shown in FIG. 2. In illustrative embodiments, first seam aperture 211 is located along seam 210 and second seam aperture 212 also is located along seam 210. Any air that is discharged from first air chamber 50 in first air bag 51 (during deformation of first air bag 51) passes to surroundings outside of first air bag 51 through one or both of first and second seam apertures 211, 212 as suggested in FIGS. 2 and 6-8. Similarly, any air that is discharged from second air chamber 60 in second air bag 52 (during deformation of second air bag 52) passes to surroundings outside of second air bag 52 through one or both of first and second seam apertures 211, 212.

Figure 5:
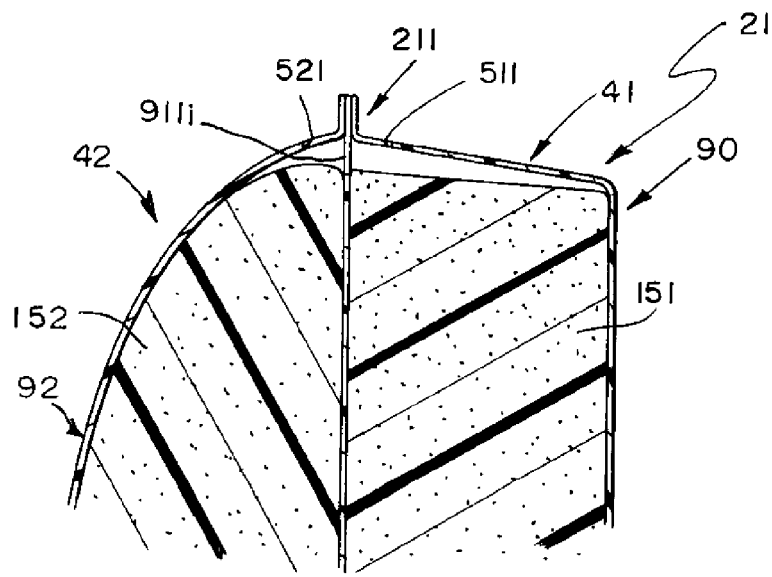
FIG. 5 is a reduced sectional view taken along line 5-5 of FIG. 4.

First seam aperture 211 is established as shown, for example, in FIGS. 2, 4, and 5, by a union (i.e., merger) between first air-discharge port 511 formed in first air bag 51 and first air-discharge port 521 formed in second air bag 52. In an illustrative embodiment, first seam aperture 211 interrupts seam 210 as suggested in FIG. 2.

Second seam aperture 212 is established as shown, for example, in FIG. 2, by a union (i.e., merger) between second air-discharge port 512 formed in second air bag 51 and second air-discharge port 522 formed in second air bag 52. In an illustrative embodiment, second seam aperture 212 interrupts seam 210 as suggested in FIG. 2. In an illustrative embodiment, first and second seam apertures 211, 212 are arranged to lie in circumferentially spaced-apart relation to one another on an arcuate portion of seam 210 having an arc length 210s subtended by a central angle 72 of about 72°.

First air bag 51 can be formed using any suitable method using any suitable material. In an illustrative embodiment, as suggested in FIG. 3, first air bag 51 comprises an inner shell 90 formed to include separate first and second air-discharge ports 511, 512 and a portion 91a of partition 91 coupled to inner shell 90 to form first air chamber 50 therebetween.

In an illustrative embodiment, as shown in FIG. 3, partition 91 is formed to include a first notch 91 In along a perimeter edge 910 thereof. Partition 91 includes a first arch-shaped interior edge 911i that is sized and shaped to form first notch 911n. As suggested in FIG. 3 and shown, for example, in FIG. 4, first notch 911n in partition 91, first air-discharge port 511 in first air bag 51, and first air-discharge port 521 in second air bag 52 cooperate to define first seam aperture 211 along seam 20 in right-side ride-down pad 21.

Second air bag 52 can be formed using any suitable method using any suitable material. In an illustrative embodiment, as suggested in FIGS. 3 and 4, second air bag 52 comprises an outer shell 92 formed to include first and second air-discharge ports 521, 522 and a portion 91b of partition 91 coupled to outer shell 92 to form second air chamber 60 therebetween.

In an illustrative embodiment, as shown in FIG. 3, partition 91 is formed to include a second notch 912n along perimeter edge 910. Partition 91 includes a second arch-shaped interior edge 912i that is sized and shaped to form second notch 912n. Second notch 912n is arranged to lie in circumferentially spaced-apart relation to first notch 91 in on an arcuate portion of perimeter edge 910 having an arc length 910s subtended by a central angle 72 of about 72° as shown in FIG. 3. As suggested in FIG. 3, second notch 912n in partition, second air-discharge port 512 in first air bag 51, and second air-discharge port 522 in second air bag 52 cooperate to define second seam aperture 212 along seam 20 in right-side ride-down pad 22.

A deformable support frame as disclosed herein provides means for supporting the vessel (e.g., bag) to maintain at least a predetermined volume of air (or other fluid) in the air chamber until the vessel is deformed when exposed to an external impact force. The vessel is thus supported by the deformable support frame so that the vessel does not deform too quickly and deforms at a rate that allows the vessel to absorb external energy associated with the external impact force.

Figure 6:
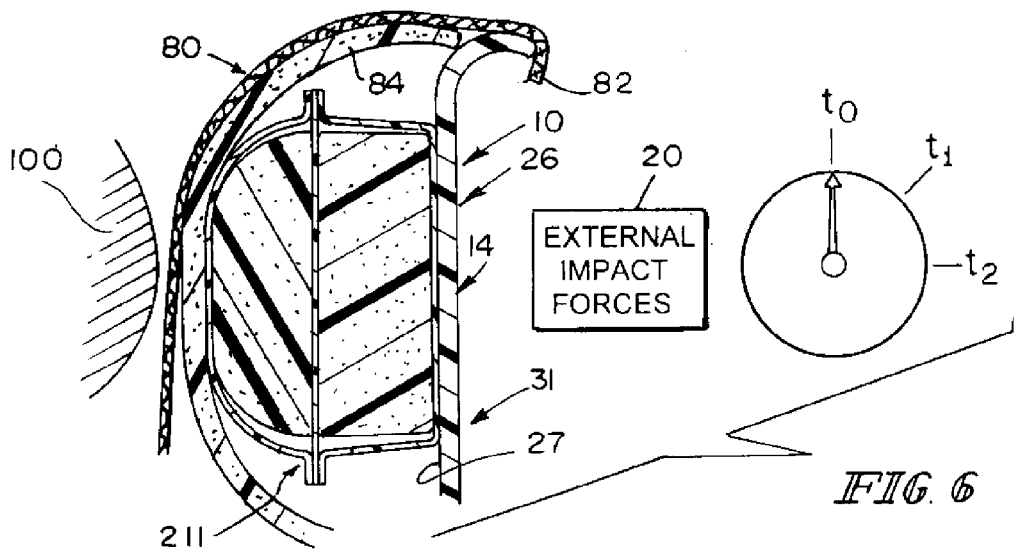
FIGS. 6-8 show a sequence in which the first and second force dissipaters in the right-side ride-down pad are deformed following application of an external impact force to the first side-wing panel of the headrest to cause air to be discharged from the first and second air bags through the first seam aperture and to deform the deformable support frames in the first and second air bags so as to minimize the magnitude of a resulting force applied to a child seated in a juvenile vehicle seat carrying the right-side ride-down pad and thereby to minimize the g-load (acceleration) caused by the resulting force and experienced by the seated child.

Absorption of external energy associated with external energy associated with external impact force 20 by first and second force dissipaters 41, 42 of right-side ride-down pad 21 is shown illustratively and diagrammatically in a sequence shown in FIGS. 6-8. Left-side ride-down pad 22 absorbs external energy in a similar manner when an external impact force strikes a second side-wing panel 32 carrying left-side ride-down pad 22. It is within the scope of the present disclosure to mount one of ride-down pads 21, 22 in an impact strike zone on a juvenile seat or other device. It is within the scope of the present disclosure to mount a ride-down pad on an exterior or interior wall (or both an interior and exterior wall) of the seat or device.

As suggested diagrammatically in FIG. 6, each of force dissipaters 41, 42 included in right-side ride-down pad 21 is substantially undeformed at time $t_0$ before any collision involving juvenile vehicle seat 10 takes place. First force dissipater 41 comprises an undeformed first air bag 51 and an undeformed first deformable support frame 151. Second force dissipater 42 comprises an undeformed second air bag 52 and an undeformed second deformable support frame 152.

As suggested diagrammatically in FIG. 7, during an illustrative collision, external impact force 20 strikes first side-wing panel 31 of headrest 26 to deform a portion of first (inner) force dissipater 41 and second (outer) force dissipater 42. During such deformation, at later time $t_1$, some of the air extant in second air chamber 60 of second air bag 52 is discharged through first air-discharge port 521 of first seam aperture 211 (and second air-discharge port 522 of second seam aperture 212) as discharged air 74 to the atmosphere surrounding second air bag 52 of second (outer) force dissipater 42. At time $t_1$, some of the transferred energy associated with external impact force 20 has been dissipated owing, in part, to deformation of second air bag 52 and second deformable support frame 152 and discharge of air from second air chamber 60 through air-discharge ports 521, 522.

As suggested diagrammatically in FIG. 7, external impact force 20 also acts to deform a portion of first (inner) force dissipater 41, for example, first air bag 51 and first deformable support frame 151. Some of the air extant in first air chamber 50 of first air bag 51 is exhausted through air-discharge ports 511, 512 as discharged air 75 to the atmosphere surrounding first air bag 51 of first (inner) force dissipater 51 as suggested in FIG. 7.

At later time $t_2$, as suggested in FIG. 7, juvenile vehicle seat 10 has moved relative to child 100 to cause a portion (e.g., the head) of child 100 to contact and deform right-side ride-down pad 21. First (inner) and second (outer) force dissipaters 41, 42 of right-side ride-down pad 21 cooperate to absorb energy transferred by external impact force 20 to minimize a resulting force applied to child 100 seated in juvenile vehicle seat 10. This energy absorption feature minimizes the g-loads (acceleration) experienced by child 100 and also maximizes the ride-down time between the first strike of an impacting object on first side-wing panel 31 of headrest 26 of juvenile vehicle seat 10 and the moment that the resulting force reaches zero.

In an illustrative embodiment, an outer cover 80 is coupled to headrest 26 and arranged to cover each of right-side and left-side ride-down pads 21, 22. Outer cover 80 functions to dissipate energy associated with external impact forces 20 and to protect ride-down pads 21, 22 from damage. In an illustrative embodiment, outer cover 80 includes an outer skin 82 and a cushion 84 under outer skin 82 as shown, for example, in FIGS. 3-5.

As suggested in FIGS. 2 and 3, right-side ride-down pad 21 includes an inner shell 90, an outer shell 92, and a partition 91 interposed between inner and outer shells 90, 92. Inner shell 90 and a first surface 91a of partition 91 cooperate to form first air chamber 50 therebetween. Outer shell 92 and a second surface 91b of partition 91 cooperate to form second air chamber 60 therebetween.

Inner shell 90 is coupled to partition 91 as suggested in FIGS. 2 and 3 to form first air bag 51. In an illustrative embodiment, inner shell 90 includes a perimeter rim 90r coupled to first surface 91a of partition 91 and a support-frame container 90c appended to perimeter rim 90r and arranged to extend away from partition 91 and formed to include an interior region sized to receive first deformable support frame 151 therein as suggested in FIG. 3.

Inner shell 90 is formed to include first air-discharge port 511 of first air bag 51 as suggested in FIG. 3. Perimeter rim 90r of inner shell 90 is interrupted by first air-discharge port 511. First air-discharge port 511 formed in first air bag 51 is bounded by an arch-shaped edge included in inner shell 90 as shown, for example, in FIGS. 3 and 4. Second air-discharge port 512 in first air bag 51 has similar characteristics as shown, for example, in FIG. 3.

Outer shell 92 is coupled to partition 91 as suggested in FIGS. 2 and 3 to form second air bag 52. In an illustrative embodiment, outer shell 92 includes an annular perimeter rim 92r coupled to second surface 91b of partition 91 and a support-frame container 92c appended to perimeter rim 92r and arranged to extend away from partition 91 and formed to include an interior region sized to receive second deformable support frame 152 therein as suggested in FIG. 3.

Outer shell 92 is formed to include a first air-discharge port 521 of second air bag 52 as suggested in FIG. 3. Perimeter rim 92r of outer shell 92 is interrupted by first air-discharge port 521. First air-discharge port 521 formed in second air bag 52 is bounded by an arch-shaped edge included in outer shell 92 as shown, for example, in FIG. 3. Second air-discharge port 522 in second air bag 52 has similar characteristics as shown, for example, in FIG. 3.

Partition 91 is oriented relative to inner and outer shells 90, 92 to align first notch 91 In formed in partition 91 in registry with first air-discharge ports 511, 521 of first and second air bags 51, 52 to form first seam aperture 211 at seam 210 as suggested in FIGS. 2-4. Similarly, partition 91 is oriented relative to inner and outer shells 90, 92 to align second notch 912n formed in partition 91 in registry with second air-discharge ports 512, 522 of first and second air bags 51, 52 to form second seam aperture at seam 210 as suggested in FIGS. 2 and 3. In an illustrative embodiment, as suggested in FIG. 4, the arch-shaped edge in inner shell 90 that is configured to form first air-discharge port 511 mates and cooperates with the arch-shaped edge in outer shell 92 that is configured to form first air-discharge port 521 to define a circular edge 211ce bounding first seam aperture 211. Second seam aperture 212 is bounded by a similar circular edge.

As suggested in FIG. 2, each of first and second air-discharge ports 511, 512 provided in first air bag 51 are formed to include means for discharging air from first air chamber 50 to the surroundings outside first air bag 51 at a metered rate when first bag 51 is exposed to external impact force 20. Similarly, each of first and second air-discharge ports 521, 522 provided in second air bag 52 are formed to include means for discharging air from second air chamber 60 to the surroundings outside second air bag 52 at a metered rate when second air bag 52 is exposed to external impact force 20. As a result, each of first and second air bags 51, 52 will be exposed to an external impact force to change from the undeformed shape to a deformed shape so that first and second force dissipaters 41, 42 of right-side ride down pad 21 absorb external energy associated with external impact force 20 to minimize g-loads experienced by child 100 seated in juvenile vehicle seat 10.

In an illustrative embodiment, as suggested in FIG. 1, juvenile vehicle seat 10 includes a seat back 12 comprising a rear panel 30, a first side-wing panel 31 extending in a forward direction from rear panel 30, and a second side-wing panel 32 extending in the forward direction from rear panel 30. Second side-wing panel 32 is arranged to lie in spaced-apart relation to first side-wing panel 31 as shown, for example, in FIG. 1 to locate rear panel 30 therebetween. First force dissipater 41 of right-side ride-down pad 21 is coupled to first side-wing panel 31 using any suitable fastener (represented, in FIG. 2, by dot pattern 41f). First and second force dissipaters 41, 42 of right-side ride-down pad 21 are arranged to lie between first and second side-wing panels 31, 32 as suggested in FIG. 1. As suggested in FIGS. 1 and 2, first and second air bags 51, 52 included in right-side ride-down pad 21 are oriented relative to seat back 12 to cause first and second seam apertures 211, 212 to face in the forward direction and away from rear panels.

The invention claimed is:

1. A child restraint comprising
a juvenile vehicle seat and
an energy-dissipation system coupled to the juvenile vehicle seat, the energy-dissipation system comprising a first force dissipater associated with the juvenile vehicle seat and a second force dissipater positioned to lie in spaced-apart relation to the juvenile seat to locate the first force dissipater therebetween, wherein the first force dissipater includes a first air bag formed to include a first air chamber and a first air-discharge port opening into the first air chamber and a deformable first support frame located in the first air chamber and configured to maintain at least a predetermined volume of air in the first air chamber until the first air bag is deformed when exposed to an external impact force, the second force dissipater includes a second air bag formed to include a second air chamber and a first air-discharge port opening into the second air chamber and a deformable second support frame located in the second air chamber and configured to maintain at least a predetermined volume of air in the second air chamber until the second air bag is deformed when exposed to an external impact force, the first and second air bags are arranged to meet along a seam common to the first and second air bags, the first and second air bags are arranged to cause the first air-discharge ports of the first and second air bags to merge with one another at the seam to form a first seam aperture opening into the first air chamber of the first air bag and into the second air chamber of the second air bag, and the first seam aperture is configured to provide means for discharging air from the first and second air chambers to surroundings at a metered rate when a ride-down pad comprising the first and second force dissipaters is exposed to an external impact force so that the ride-down pad absorbs external energy associated with the external impact force to minimize g-loads experienced by a child seated on the juvenile vehicle seat.

2. The child restraint of claim 1 wherein the first air bag is also formed to include a second air-discharge port opening into the first air chamber, the second air bag is also formed to include a second air-discharge port opening into the second air chamber, the first and second air bags are arranged to cause the second air-discharge ports of the first and second air bags to merge with one another at the seam to form a second seam aperture opening into the first air chamber of the first air bag and into the second air chamber of the second air bag, and the second seam aperture is configured to provide auxiliary means for discharging air from the first and second air chambers to the surroundings at a metered rate when the ride-down pad is exposed to the external impact force so that the ride-down pad absorbs external energy associated with the external impact force to minimize g-loads experienced by a child seated on the juvenile vehicle seat.

3. The child restraint of claim 2, wherein the first and second seam apertures are arranged to lie in spaced-apart relation to one another on a generally arcuate portion of the seam having an arc length subtended by a central angle of about 72°.

4. The child restraint of claim 3, wherein the juvenile vehicle seat includes a seat back comprising a rear panel, a first side-wing panel extending in a forward direction from the rear panel, and a second side-wing panel extending in the forward direction from the rear panel and lying in spaced-apart relation to the first side-wing panel to locate the rear panel therebetween, the first force dissipater is coupled to the first side-wing panel and arranged to lie between the first and second side-wing panels, and the first and second air bags are oriented relative to the seat back to cause the first and second seam apertures to face in the forward direction and away from the rear panel.

5. The child restraint of claim 2, wherein the juvenile vehicle seat includes a seat back comprising a rear panel, a first side-wing panel extending in a forward direction from the rear panel, and a second side-wing panel extending in the forward direction from the rear panel and lying in spaced-apart relation to the first side-wing panel to locate the rear panel therebetween, the first force dissipater is coupled to the first side-wing panel and arranged to lie between the first and second side-wing panels, and the first and second air bags are oriented relative to the seat back to cause the first and second seam apertures to face in the forward direction and away from the rear panel.

6. The child restraint of claim 5, wherein the seat back includes a backrest and a headrest coupled to the backrest and the rear panel, first side-wing panel, and the second side-wing panel are included in the headrest.

7. The child restraint of claim 1, wherein the ride-down pad includes an inner shell, an outer shell, and a partition interposed between the inner and outer shells, the inner shell and a first surface of the partition cooperate to form the first air chamber therebetween, and the outer shell and a second surface of the partition cooperate to form the second air chamber therebetween.

8. The child restraint of claim 7, wherein the inner shell is coupled to the partition to form the first air bag and the outer shell is coupled to the partition to form the second air bag.

9. The child restraint of claim 7, wherein the inner shell is formed to include the first air-discharge port of the first air bag and the outer shell is formed to include the first air-discharge port of the second air bag.

10. The child restraint of claim 9, wherein the partition is formed to include a first notch along a perimeter edge thereof and the partition is oriented relative to the inner and outer shells to align the first notch in registry with the first air-discharge ports of the first and second air bag to cooperate therewith to form the first seam aperture.

11. The child restraint of claim 10, wherein the first notch is bounded by an arch-shaped edge included in the partition, the first air-discharge port formed in the first air bag is bounded by an arch-shaped edge included in the inner shell, and the first air-discharge port formed in the second air bag is bounded by an arch-shaped edge included in the outer shell.

12. The child restraint of claim 9, wherein the first air-discharge port formed in the first air bag is bounded by an arch-shaped edge included in the inner shell and the first air-discharge port formed in the second air bag is bounded by an arch-shaped edge included in the outer shell.

13. The child restraint of claim 12, wherein the arch-shaped edges of the inner and outer shells mate and cooperate to define a circular edge bounding the first seam aperture.

14. A child restraint comprising
a juvenile vehicle seat and
an energy-dissipation system coupled to the juvenile vehicle seat, the energy-dissipation system comprising a ride-down pad configured to absorb external energy associated with an external impact force applied to the juvenile vehicle seat to minimize g-loads experienced by a child seated on the juvenile vehicle seat, the ride-down pad including a first air bag formed to include a first air chamber and a second air bag formed to include a second air chamber and arranged to meet with the first air bag along a seam common to both of the first and second air bags, wherein the first air bag is also formed to include a first air-discharge aperture opening into the first air chamber, the second air bag is also formed to include a first air-discharge aperture opening into the second air chamber, the first air-discharge apertures of the first and second air bags are arranged to meet along the seam, and the first and second air bags are oriented relative to one another to cause the first air-discharge port of the first air bag to merge with the first air-discharge port of the second air bag to form a first seam aperture along the seam opening into the first air chamber of the first air bag and into the second air chamber of the second air bag.

15. The child restraint of claim 14, wherein the first air bag is also formed to include a second air-discharge port opening into the first air chamber, the second air bag is also formed to include a second air-discharge port opening into the second air chamber, the second air-discharge ports of the first and second air bags are arranged to meet along the seam and merge with one another to form a second seam aperture along the seam opening into the first air chamber of the first air bag and into the second air chamber of the second air bag.

16. The child restraint of claim 15, wherein the first and second seam apertures are arranged to lie in spaced-apart relation to one another on a generally arcuate portion of the seam having an arc length subtended by a central angle of about 72°.

17. The child restraint of claim 15, wherein the juvenile vehicle seat includes a seat back comprising a rear panel, a first side-wing panel extending in a forward direction, and a second side-wing panel extending in a forward direction and lying in spaced-apart relation to the first side-wing panel to locate the rear panel therebetween, the first air bag is coupled to the first side-wing panel and arranged to lie between the first and second side-wing panels, and the first and second air bags are oriented relative to the seat back to cause the first and second seam apertures to face in the forward direction and away from the rear panel.

18. The child restraint of claim 14, wherein the ride-down pad further includes a first deformable support frame located in the first air chamber and configured to support the first air bag to maintain at least a predetermined volume of air in the first air chamber until the first air bag is deformed when exposed to an external impact force and a second deformable support frame located in the second air chamber and configured to support the second air bag to maintain at least a predetermined volume of air in the second air chamber until the second air bag is deformed when exposed to an external impact force.

19. A child restraint comprising
a juvenile vehicle seat and
an energy-dissipation system coupled to the juvenile vehicle seat, the energy-dissipation system comprising a ride-down pad configured to absorb external energy associated with an external impact force applied to the juvenile vehicle seat to minimize g-loads experienced by a child seated on the juvenile vehicle seat, the ride-down pad including an inner shell formed to include a first air-discharge port, an outer shell formed to include a first air-discharge port, and a partition located between the inner and outer shells, the inner shell and an inner surface of the partition cooperating to form a first air chamber communicating with the first air-discharge port formed in the inner shell, the outer shell and an outer surface of the partition cooperating to form a second air chamber in communication with the first air-discharge port formed in the outer shell, wherein a first seam aperture is formed at a seam established at a junction between the partition and the inner and outer shells by a union of the first air-discharge ports formed in the inner and outer shells and the first seam aperture is configured to provide means for discharging air from the first and second air chambers to surroundings at a metered rate when the ride-down pad is exposed to an external impact force so that the ride-down pad absorbs external energy associated with the external impact force to minimize g-loads experienced by a child seated on the juvenile vehicle seat.

20. The child restraint of claim 19, wherein the ride-down pad further includes a first deformable support frame located in the first air chamber and configured to support the inner shell to maintain at least a predetermined volume of air in the first air chamber until the inner shell is deformed when exposed to an external impact force and a second deformable support frame located in the outer shell and configured to support the outer shell to maintain at least a predetermined volume of air in the second air chamber until the outer shell is deformed when exposed to an external impact force.

* * * * *